(12) United States Patent
Schmitz

(10) Patent No.: US 11,618,634 B2
(45) Date of Patent: Apr. 4, 2023

(54) DEVICE FOR AT LEAST ONE INDUSTRIAL AUTOMATED PROCESS

(71) Applicant: Windmöller & Hölscher KG, Lengerich (DE)

(72) Inventor: Torsten Schmitz, Greven (DE)

(73) Assignee: Windmöller & Hölscher KG, Lengerich (DE)

( * ) Notice: Subject to any disclaimer, the term of this patent is extended or adjusted under 35 U.S.C. 154(b) by 139 days.

(21) Appl. No.: 16/091,775

(22) PCT Filed: Jan. 26, 2017

(86) PCT No.: PCT/EP2017/051690
§ 371 (c)(1),
(2) Date: Oct. 5, 2018

(87) PCT Pub. No.: WO2017/174223
PCT Pub. Date: Oct. 12, 2017

(65) Prior Publication Data
US 2019/0100381 A1  Apr. 4, 2019

(30) Foreign Application Priority Data
Apr. 8, 2016  (DE) ..................... 10 2016 106 522.6

(51) Int. Cl.
*B65G 43/00*  (2006.01)
*G05B 19/418*  (2006.01)
*B65G 47/90*  (2006.01)

(52) U.S. Cl.
CPC ........... *B65G 43/00* (2013.01); *B65G 47/905* (2013.01); *G05B 19/41875* (2013.01);
(Continued)

(58) Field of Classification Search
None
See application file for complete search history.

(56) References Cited

U.S. PATENT DOCUMENTS

2004/0075689 A1  4/2004  Schleiss et al.
2007/0162287 A1*  7/2007  Dietzsch .......... G05B 19/41875
  235/376
(Continued)

FOREIGN PATENT DOCUMENTS

DE  19903826 A1  8/2000
DE  10348564 A1  5/2004
(Continued)

OTHER PUBLICATIONS

Neidig et al., RFID in der Automatisierung—ein Blick in die Zukunft, atp magazin, 2008, 50(7):34-38, with its English abstract.
(Continued)

*Primary Examiner* — Sean Shechtman
(74) *Attorney, Agent, or Firm* — Rudy J. Ng; Bret E. Field; Bozicevic, Field & Francis LLP

(57) ABSTRACT

The invention relates to a device (10) for at least one industrial automated process (110), in particular a weighing and/or packing and/or arranging and/or packing process, comprising: at least one sensor (30) for determining at least one process data value which is relevant to the entire process by detecting at least one partial process parameter of the device (10), which parameter is relevant to the entire process, a processing device (40), which is electrically connected to the sensor (30) for processing the process data value, an interface device (50) for data connection and for forwarding the process data value to at least one individual machine (2a, 2b, 2c) located upstream and/or downstream in
(Continued)

Figure 1:
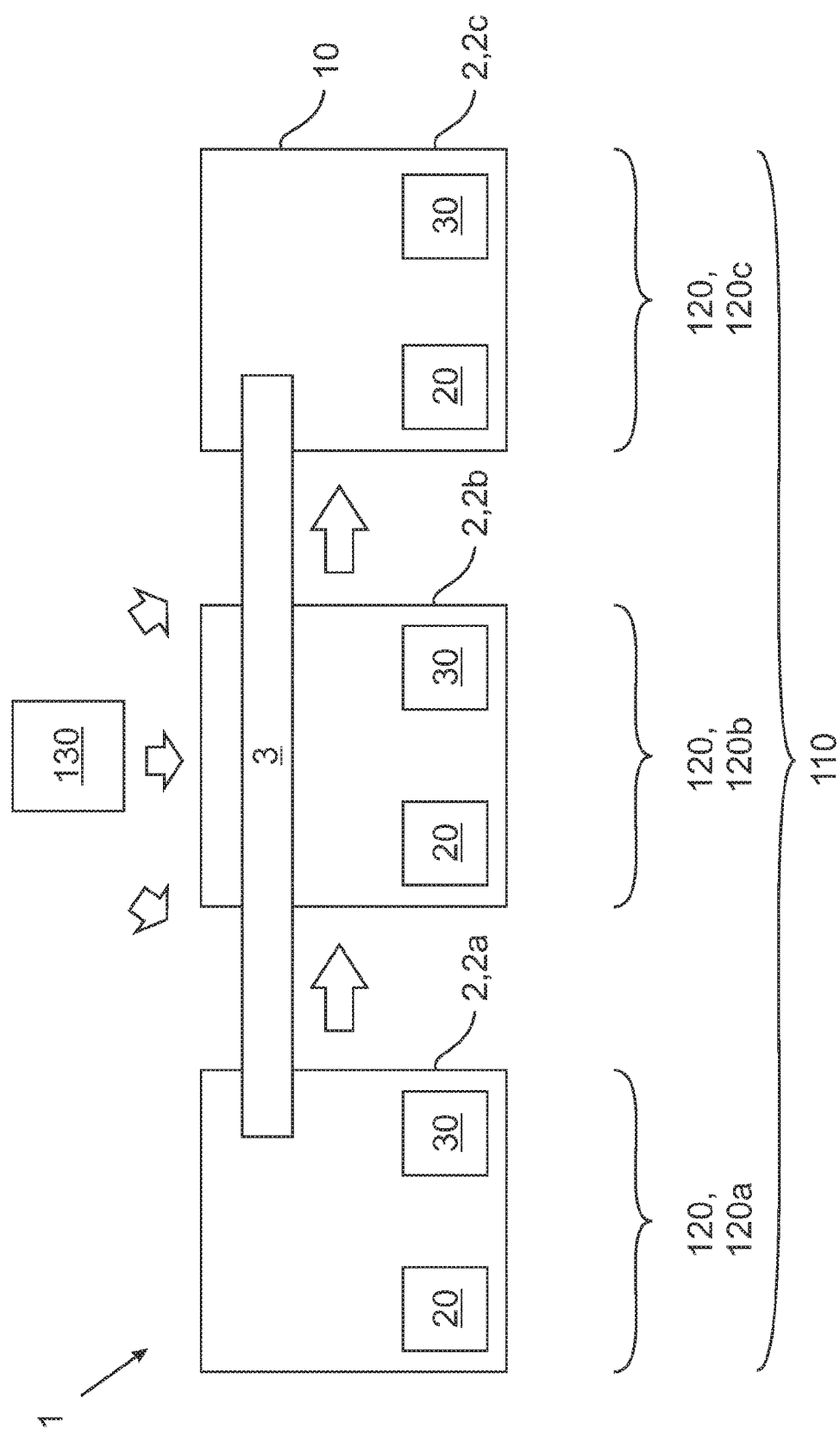

the process (110), wherein the total process (110) can be evaluated with reference to the process data value by comparison with a pre-defined process instruction (130).

14 Claims, 2 Drawing Sheets

(52) U.S. Cl.
CPC .............. *G05B 2219/31455* (2013.01); *G05B 2219/32179* (2013.01); *G05B 2219/45048* (2013.01); *Y02P 90/02* (2015.11)

(56) References Cited

U.S. PATENT DOCUMENTS

| | | | | |
|---|---|---|---|---|
| 2008/0066019 | A1* | 3/2008 | Worek | G05B 19/4183 700/17 |
| 2013/0231772 | A1* | 9/2013 | Hahn | B29C 67/00 700/204 |
| 2015/0316918 | A1 | 11/2015 | Schleiss et al. | |

FOREIGN PATENT DOCUMENTS

| | | |
|---|---|---|
| DE | 102011011896 A1 | 8/2012 |
| DE | 102013101628 A1 | 8/2014 |
| EP | 1462894 A2 | 9/2004 |
| EP | 1471008 A1 | 10/2004 |

OTHER PUBLICATIONS

Office Action for German Application No. 10 2016 106 522.6, dated Dec. 12, 2016, with its English translation, 7 pages.
Examination Report for European Application No. 17703674.6 dated Aug. 7, 2020, with its English translation, 5 pages.
Office Action for German Application No. 10 2016 106 522.6 dated Jun. 10, 2021, with its English translation, 7 pages.
Examination Report for European Application No. 17703674.6 dated Apr. 14, 2021, with its English translation, 5 pages.
Office Action for European Application No. 17703674.6 dated May 30, 2022, with its English translation, 6 pages.

\* cited by examiner

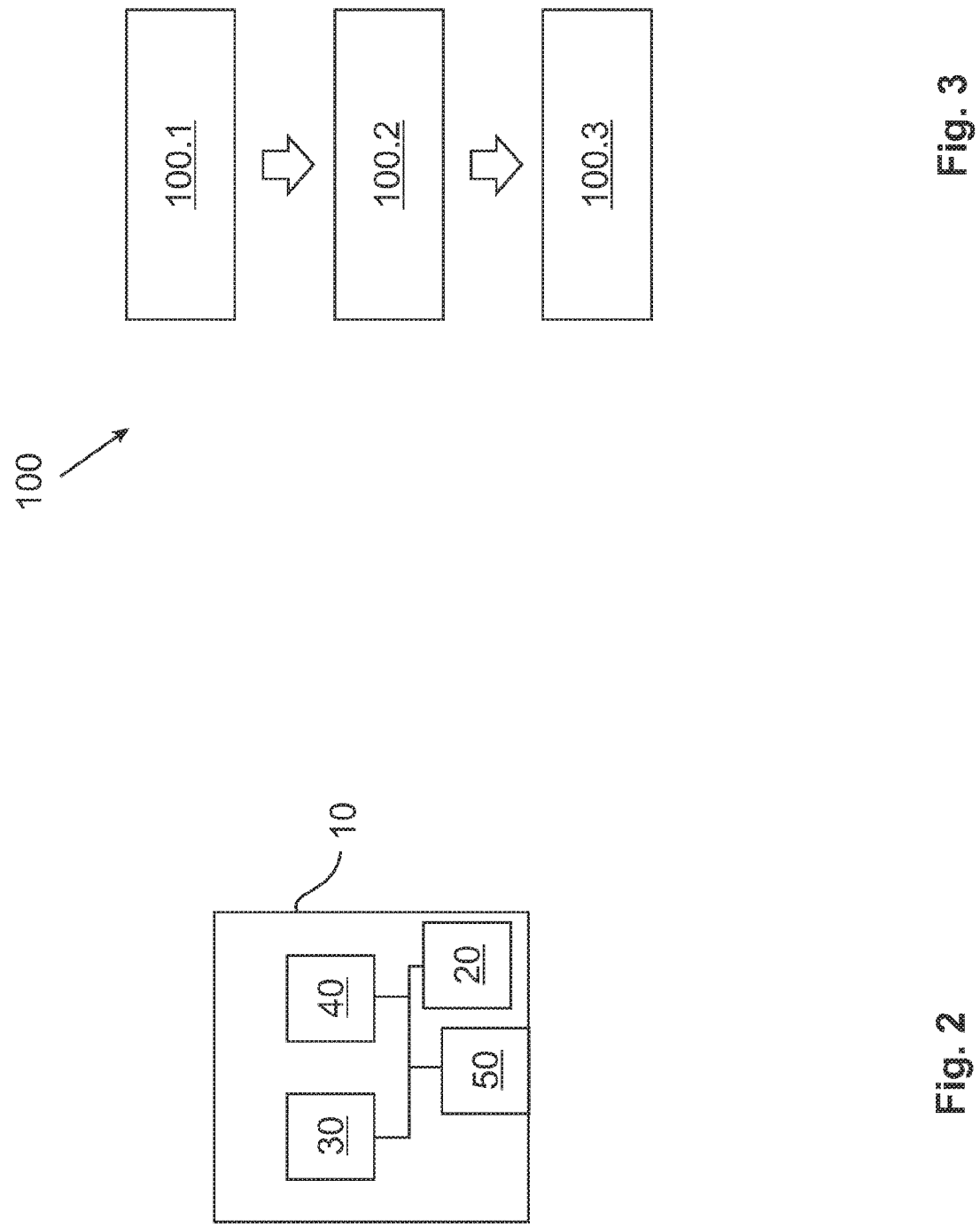

DEVICE FOR AT LEAST ONE INDUSTRIAL AUTOMATED PROCESS

The present invention relates to a device for at least one (industrial) automated process. Moreover, the invention refers to a system, as well as a method.

It is known from the prior art that, in industrial, at least partially automated processes, such as for example weighing- and/or filling- and/or arranging- and/or packing processes, a plurality of influencing factors affects the quality of the process result. The process result is, for example, a product produced through the process and/or a palletized good, which, for example, is packed and/or secured with film. The influencing factors here can, for example, influence the stability of the cargo, and, for example, also lead to the cargo security no longer being met. For example, in particular the geometrical structure and filling degree of the granulate sack, the friction coefficient of the used FFS (form-fill-seal) film, the stacking pattern, as well as possible intermediate layers, the multidimensional stress-strain behavior of a film, and/or the parametrization of a packing machine can be named as influencing factors on the quality of a pallet with granulate sacks as palletized goods.

This manner of influencing factors here arise customarily in each sub-process of the overall process. In each of these sub-processes, at least one individual machine, for example an industrial robot, here acts upon the material, or product to be processed and/or to be packaged. In each of these sub-processes, influencing factors can arise here, such as for example deviations from the predetermined material and/or product properties, such as for example from film properties, and/or deviations from machine parameters of the individual machine in the respective sub-process, and/or the like. Even if such a deviation in the respective sub-process does not necessarily (noticeably) negatively affect the sub-process result, and therefore remains unrecognized, these deviations can, in the further sub-processes, lead to a reduction in quality and to an insufficient process result of the overall process. Thus, for example, a defective arrangement of the goods, by a palletizer, does not yet negatively impact in the "palletizing" sub-process, can, however, in a downstream sub-process, for example in the packing by a stretch hooder, lead to an insufficient sub-process result (for example, to an insufficient cargo securing). Further, it is often very complicated and complex to sufficiently precisely establish these manner of influences, as well as the affects on the process result, and/or to ensure the process quality.

It is therefore an object of the present invention to at least partially reduce the above-described disadvantages. In particular, it is the object of the present invention to enable an improved and/or simplified and/or more cost-effective and/or or more reliable evaluation of the process and/or quality assurance.

The above object is achieved through a device having the features according to the present disclosure, a system having the features according to the present disclosure, as well as through a method having the features according to the present disclosure. Further features and details of the invention result from the respective dependent claims, the description, and the illustrations. Here, features and details apply, which are described in conjunction with the device according to the invention, of course also in conjunction with the system according to the invention, as well as the method according to the invention, and vice versa, so that, with respect to the publication, references in or can always mutually be made to the individual aspects of the invention.

The object is, in particular, achieved through a device for at least one industrial (at least partially-automated and/or fully automated) process, preferably a weighing- and/or filling- and/or arranging- and/or packing process. Preferably, the process here includes multiple sub-processes, for example the weighing process as a first sub-process and/or the filling process as a second sub-process, and/or the arranging process as a third sub-process, and/or the packing process as a fourth sub-process, wherein all sub-process form the overall process. Particularly preferably, here the packaging process is performed after the arranging process (for example as palletizing process), and/or the arranging process is performed after the filling process, and/or the filling process is performed after the weighing process.

Preferably, for each sub-process, at least one individual machine (specific in particular for this sub-process) is respectively provided, in order to at least partially carry out the sub-process, wherein, for example, at least one of these respective individual machines can be configured as a device according to the invention.

In particular, it is provided that the device according to the invention comprises at least one sensor for determining at least one process data value, relevant to the overall process, through a detection of at least one sub-process parameter, relevant to the overall process, of the device (according to the invention). The sub-process parameter here is, for example, a measured variable on the device (or individual machine), which is directly or indirectly detected through the sensor, for example a moment (torque), or a temperature, or an electrical variable, or the like on the device. In particular, here the sensor, depending upon the detected sub-process parameter and/or upon the measured measure variable, outputs the sub-process data value as a detection value of the sub-process parameter, or measured value of the measured variable. Preferably, here the process data value makes a qualitative and/or quantitative statement about the sub-process parameter possible, which, for example, is a physical variable and/or a property on the device (or individual machine) according to the invention, and/or on the material and/or on the product.

It can further be provided that a processing device of the device according to the invention is provided, which processing device, to process the process data value, is electrically connected with the sensor, that is, for example, connected directly or indirectly electrically, and/or wired and/or via radio. The processing device includes, for example, at least one electronic component, such as for example an integrated switching circuit, and/or a microprocessor, in order to quickly and reliably assess the process data value. In particular, it can be possible that, through the processing device, a process data value is assessed, which was determined in an upstream sub-process and/or an upstream individual machine.

Further, an interface device for data connection is preferably provided, which, for example is or can be connected with a transmitting device. In particular, the interface device here serves to forward the process data value to at least one individual machine upstream and/or downstream in the process, that is in particular an upstream or downstream sub-process. The individual machines here can, for example, be configured as further devices according to the invention, wherein they then differ sub-process-specifically, however. Thus, for example, a first individual machine or a first device according to the invention is configured as a palletizer, and/or a second individual machine or a second device according to the invention is configured as a packaging machine.

A packing machine is likewise also protected, in particular a hood stretcher, wherein the packing machine is configured at least partially according to the device according to the invention, and/or finds use as an individual machine in the system according to the invention, and/or with the method according to the invention.

A palletizer is likewise also placed under protection, wherein the palletizer is configured at least partially according to the device according to the invention, and/or finds use as an individual machine in the system according to the invention, and/or with the method according to the invention.

A filling machine is likewise also placed under protection, preferably a form-fill-seal machine, wherein the filling machine is configured at least partially according to the device according to the invention, and/or finds use as an individual machine in the system according to the invention, and/or with the method according the invention.

Features and details, which are described in conjunction with the device according to the invention, the method according to the invention, and/or the system according to the invention, respectively of course also apply in conjunction with the filling machine according to the invention, and/or the packing machine according to the invention, and/or the palletizer according to the invention.

It is further provided according to the invention that, based on the process data value, the entire process can be evaluated through comparison with a pre-defined process default. This has the advantage that also overall- and/or sub-process-relevant process data values, which customarily remain unrecognized in the sub-process, can serve to evaluate the entire process, and thus, for example, improve the process quality and/or make a quality control possible.

For example, the sub-process parameter includes at least one of the following parameters, or is dependent upon at least one of the following parameters:
  the quality of a pallet with granulate sacks as palletized goods or as a product, in particular the geometric structure and/or the filling degree of the granulate sack,
  the friction coefficient of the FFS film used,
  the stacking pattern,
  possible intermediate layers,
  the multidimensional stress-strain behavior of a film, and/or
  the parametrizing of a packaging machine.

The determined process data value here is, for example, an overall-process-relevant and/or a sub-process-relevant process data value. This means, for example, that the process data value is customarily not relevant for the sub-process, in which it is determined on the device according to the invention and/or individual machine of the sub-process, and/or is only relevant functionally within the sub-process, and/or is not (for example permanently) stored and/or monitored and/or compared and/or evaluated.

Here, the sub-process parameter preferably includes (also), for example, such parameters of a sub-process, which are only functionally relevant for the respective sub-process, and therefore, for example, do not have to usually be stored. Here, the process parameter can, for example be a measured variable and/or a machine parameter and/or a product parameter and/or a material parameter in the respective sub-process. In particular, here the process data value is a value of the process parameter, which, for example, is displayed on a display device (for example, without having to be permanently stored) for an operator of the individual machine and/or device, according to the invention, of the sub-process. Preferably, a permanent storing of the process data value occurs here, independently of this display and/or functional review.

According to an advantageous further development of the invention, it can be provided that the device comprises a data storage unit, in particular non-volatile and/or configured for persistent data storage, in order to in particular permanently store the determined process data value. The data storage unit here is in particular an electronic data storage unit, in order to permanently, that is, for example, persistently store the process data value. In particular, this storing occurs independently of a display of the process within the sub-process, so that an assessment of the process data value can also occur outside of the sub-process, or through other sub-processes. This, for example, enables an evaluation of a deviation in the respective sub-processes with regards to a quality control of the overall process (e.g. also of the upstream sub-processes), for example to ensure the securing of cargo. For example, here, the process data values from different sub-processes of the overall process can also be combined and/or assessed together. This enables, for example, to detect deviations or errors based on the process data values, which in particular only act upon the overall process across sub-process and otherwise, if necessary, remain unrecognized in a purely sub-process-internal assessment.

Advantageously, it can be provided in the invention that the device according to the invention is configured as an individual machine, in particular an industrial machine, and/or as an (industrial) robot. In particular, the device according to the invention here serves to configure handling- and/or manufacturing tasks within a sub-process. The process parameter here is, for example, a force and/or a moment, and/or is detected, for example, during a movement of the robot (for example, of a robot arm).

It is further conceivable that the forwarding of the process data value occurs for each process data value, and/or independently of a specific value of the process data value, and/or always. In other words, the process data values are, for example, always forwarded and/or stored, even if, in the sub-process, in which the process data values are determined, no abnormalities are yet established. In particular, a forwarding of the process data value to the at least one individual machine, upstream and/or downstream in the process, occurs here, for example through the interface device, preferably independently thereof, if within the sub-process (in which the process data value is determined), a deviation and/or abnormality of the determined process data value is established. Thus, across sub-processes, such process data values can also be used to evaluate the overall process, which process data values, in the determination by the sub-process, were not yet considered to be relevant. The quality assurance for the process thus can be significantly improved.

Likewise subject-matter of the invention is a system for at least one industrial automated process, preferably a weighing- and/or filling- and/or arranging- and/or packing process, in particular for producing and/or packing of sacks, including:
  at least two individual machines respectively for carrying out a respective sub-process of the overall process, wherein the individual machines respectively comprise at least one sensor for determining at least one overall-process-relevant process data value through a detection of at least one respective overall-process-relevant sub-process parameter, in particular on the respective individual machine, and/or at least one transmitting device for data connection with the respective individual machines, preferably for data-transmission between the individual machines and/or with a central processing device (such as a sensor), in order to provide the process data value across sub-processes, in particular to provide it digitally available, and/or at least one, in particular non-volatile data storage unit, in particular of the individual machine and/or of the transmitting device for storing of the process data value, in particular permanently, wherein, based on the process data value, the overall process can be evaluated through a comparison with a (pre-defined) process default. In particular, the (non-volatile) data storage unit here serves to (in particular centrally and/or persistently) store the process default, as well as also to (in particular centrally and/or persistently) store the process data value, wherein the storing preferably occurs in each sub-process, and/or across sub-processes. Particularly preferably, an assessment of the process data value, and/or the comparison in each of the sub-processes and/or across sub-processes, for example through a (single) central processing device, occurs. The central processing device here is a computer and/or server, for example.

The central processing device is preferably connected with the individual machine via the transmitting device, wherein the transmitting device is configured, for example, as a network, in particular an internet and/or ethernet and/or Local Area Network and/or data bus and/or radio network and/or communications network and/or the like. It is also conceivable that the transmitting device includes mobile radio interfaces to connect with a mobile radio network. The comparison and/or assessment here in particular enables that the overall process, that means, for example, also the entire system (according to the invention) to carry out the process, can be evaluated through the process data value (determined, for example, in sub-processes). The system according to the invention thus provides the same advantages, as were already described in detail for a device according to the invention. In addition, it can be provided that at least one of the respective individual machines of the system according to the invention is configured as a device according to the invention.

It can, in particular, be provided that the process default is established once for one or multiple (for example independent) processes, for example through a one-time test sequence. In the test sequence, for example at least one of the individual machines of the system according to the invention is checked, for example in that a good packed on pallets is processed with a testing method. For example, in the test sequence, an acceleration test of the good and/or of the product of the process occurs, wherein, for example, a load of at least 0.1 G and/or at least 0.2 G and/or at least 0.5 G is exerted, for at least 10 ms or at least 100 ms or at least 300 ms, on the product and/or the good, in order to test and/or measure the deformation, for example (G here is, for example, roughly 9.81 m/s$^2$). The test values determined in the test sequence here are, for example, stored one time in the process default. In particular, the process default includes the test values and/or comparison values and/or constraints (limit values) and/or further reference data and/or a formula for the product and/or the goods and/or a film of the process. Preferably, what is relevant to the (overall) process is here defined by the process default, that is, for example, which process parameters are overall-process-relevant, or which are, for example, relevant for the quality control and/or the cargo security. It is thus in particular possible, based on the process defaults, to pre-define and/or to program the determined process parameters, and/or to control the process and/or to assess the process, and/or to review the process result.

It can optionally be possible that the individual machines include at least one of the following machines and/or are respectively formed as one of the following machines, wherein the individual machines preferably differ from each other:

a hood stretcher, wherein in particular the associated sub-process parameter, which in particular is detected by the hood stretcher, is a force/path course in the stretching of a film through the hood stretcher, a palletizer, wherein in particular the associated sub-process parameter, which is determined in particular in the palletizer, is a force in the moving of a product (of the process), in particular of sacks, through the palletizer and/or a weight and/or a height of the pallet of the palletizer, a filling machine, preferably a form-fill seal-machine, wherein in particular the associated sub-process parameter, which is detected in particular in the filling machine, is a force in the further transport of the product and/or a filling time and/or an bulk density and/or a weight of the product (of the process).

The associated sub-process parameter here is, in particular, a sub process parameter, detected in a sub-process, on the respective individual machine of the sub-process. In other words, the sub-process parameter, for example, associated with the hood stretcher, for example a force/path course, is detected on the hood stretcher, and/or the sub-process parameter associated with the palletizer, for example a force, is detected on the palletizer, and/or the sub-process parameter associated with the filling machine, for example a force, is detected on the filling machine. In particular, the associated sub-process parameter here is a weight of the product, for example of the sacks. Preferably, the product here is configured as a package member and/or as a sack, which, for example through the palletizer, is combined and/or positioned and/or arranged.

Likewise subject-matter of the invention is a method for the evaluation, in particular for quality assurance, in at least one industrial (at least partially) automated process, preferably a weighing- and/or filling- and/or arranging- and/or packing process, in particular for producing and/or packing of sacks. The arrangement process here is, for example, a palletizing process. In particular, here the overall process, that is in particular the at least one industrial automated process, includes at least two sub-processes. Further, a process default, in particular across sub-processes, is preferably defined. The process default comprises preferably at least one comparison value for at least one overall-process-relevant process data value.

It is in particular provided that the subsequent steps are carried out, preferably in chronological succession or in any desired order:

a) determining the at least one overall-process-relevant process data value, in particular respectively through the individual machines, in at least one upstream sub-process of the (overall) process, and/or in a downstream sub-process of the (overall process). In particular, the downstream sub-process is downstream of the at least one upstream sub-process, so that, for example a sub-process result of the upstream sub-process is handed over to the downstream sub-process, and/or the sub-process result of the downstream sub-process corresponds to an overall process result, b) Checking the plausibility of the process data value, in particular in the/through the downstream sub-process, preferably outside of the upstream sub-process, in such a manner that the process data value is compared with the respective comparison value, preferably the associated comparison value, wherein an evaluation result (in particular specific for the overall process) is established, wherein, preferably based on the evaluation result, the upstream sub-process is evaluated. This leads in particular to the fact that, based upon the process data value, which is relevant for the overall process, an evaluation across sub-process—and therefore in particular also specific to the overall process—can occur.

The evaluation specific to the overall process shall in particular mean that, based on the process data value, the overall process can be evaluated through the comparison with the pre-defined process default, and thus, preferably based on the evaluation, a statement about the overall process can be made (e.g. about errors, which affect the result or product of the overall process, and/or errors across sub-processes, which also have influence on further sub-processes, beyond the error origin in a sub-process). In particular, it can be possible that, based on the plausibility check, the origin of the error can also be detected, in that e.g. a "fingerprint" of a deviation of the process data value is detected for comparative value, which "fingerprint" is characteristic for a certain sub-process (e.g. the upstream sub-process).

The method according to the invention provides the same advantages as have already been described in detail with respect to a device according to the invention and/or a system according to the invention. In addition, the method according to the invention can be suited to operate a device according to the invention and/or a system according to the invention.

Preferably, it can be provided that the evaluation result includes at least one recommendation and/or one deviation information for a programming of the process parameters in the (for example upstream) sub-process. Preferably, the process data values relevant to the overall process are configured as process data values relevant to the successive process, that means are relevant in particular for at least one of the (successive) downstream sub-processes, and/or irrelevant for the upstream sub-process. Therefore, the process data values relevant to the successive process, for example, are forwarded to the successive sub-processes. In particular, it is here possible, through the plausibility check, to compare the process data value, for example as an actual value, with the comparison value, for example as a target value. This, for example, enables a seamless monitoring and/or documenting of the overall processing chain, in particular with regard to the conformity with the process default, and/or with pre-stored boundary constraints of the process default, preferably to be able to ensure and/or demonstrate the security of cargo, for example a product or a good of the overall process and/or of the overall process result.

It is further conceivable that a (particularly permanent) storing of the evaluation result and/or of the process data value occurs in a process recording, preferably centrally for an operator and/or centrally/overall for all sub-processes of the process and/or encrypted. In particular, it can be provided that the steps a) and/or b) (along with the process as first process) are carried out for further processes, which in particular differ from one another (and from the first process), wherein in particular, one specific process recording occurs, and preferably additionally, one process-specific information, in particular for identifying the respective process, is in particular permanently stored in the process recording. The process recording here is preferably carried out as a log book, and in particular serves to store, permanently and/or across sub-processes, the evaluation result and/or the process data value. Preferably, here the process data value and/or the evaluation result, which was/were determined in an established sub-process, include a (for example, digital) fingerprint, which is specific for the material supplied for the established sub-processed and/or for the individual machine of the established sub-process. In other words, the process data values determined and subsequently stored on the individual machine of the sub-process permit conclusions about to what extent the processing on the respective individual machine, or the further individual machine (of the upstream process) upstream of this individual machine, was defective and/or deviant. Thus, deviations, for example through errors of the product and/or of the materials, for example due to incorrect granulates and/or incorrect film and/or other film properties, can, for example, be identified through the plausibility check (plausibility review).

In addition, it is further advantageous if a product of the downstream process, in particular as an end product of the (overall) process, is provided with an identifier, preferably a machine-readable code, which preferably comprises information about a process recording, and/or is created depending upon the process recording. In particular, the identifier includes a process-specific information, based on which the specific process, in which the process recording has occurred, can be identified. The end product is here in particular a (overall) process end product, for example the complete pallet and/or the packed goods. In particular, the identifier includes a serial number, so that, for example when a defect arises, process data values belonging to the process can be determined. The machine-readable code is here, for example, a QR ("quick response") code, or the like.

Preferably, it can be provided that the comparison value or the comparison values and/or the process default define at least one range of values, wherein a warning sequence is initiated, if, according to the plausibility checks, a deviation of the process data value from the range of values is determined, wherein preferably, the warning sequence includes a display of a notice to an operator of the downstream sub-process. Alternatively or additionally, it can be possible that the notice and/or the initiation of the warning sequence occurs in the sub-process, in which the plausibility check and/or deviation is determined. This enables for the operator to adapt the carrying out of the process in such a manner that the quality of the process result is secured.

A further advantage within the scope of the invention can be achieved, if a respective sub-process is (at least partially) performed by respectively at least one individual machine, wherein preferably, in each of the sub-processes, at least one overall-process-relevant sub-process parameter, specific to the respective sub-process, is determined, in particular through the detection of at least one overall-process-relevant sub-process parameter on or of the respective individual machine, wherein preferably, the at least one process data value includes at least one measured value and/or one measured value curve. In particular, the process data value is relevant to the overall process, in that the process data value is specific (e.g. dependent thereupon) for an influence on the product and/or the goods of the process, and/or on the overall process, which in particular influences the overall process result. Thus, the satisfactory quality of the overall process can be monitored and/or evaluated.

Furthermore, it can be provided that the process data value is determined through the detection of a material-specific and/or individual-machine-specific and/or product-specific and/or supply-process-specific, overall-process-relevant sub-process parameter. The sub-process parameter, specific to the individual machine, here refers in particular to parameters and/or measured variables on the individual machine of the sub-process. The material-specific sub-process parameter here refers in particular to the properties and/or the type of the material, and/or of the raw material, which are supplied to the respective sub-process and/or to the overall process. The product-specific sub-process parameters here refer in particular to a formula default and/or formula for producing the product of the process, such as for example a thickness and/or a width of the product. The supplying-process-specific sub-process parameters refer in particular to the supplied processes of the overall process, such as for example the supplying of film and/or raw materials and/or goods to be sacked. It is particularly advantageous that all information relevant for the process result quality, for example the security of cargo, can be evaluated.

Advantageously, it can be provided in the invention that the plausibility check is carried out adaptively, preferably in that a warning sequence is initiated upon determination of a negative evaluation result, so that an operator input to adjust the comparison value is requested and/or evaluated. In particular, the operator input here includes an input on the individual machine. It can in particular be provided that a warning and/or a prompt is issued to an operator of the individual machine if a deviation in the plausibility check is established, wherein in particular the operator can hereby evaluate these deviations. The result of the plausibility check can thus be improved.

Optionally, it is conceivable that the storage and/or a forwarding of the process data value occurs, encrypted and/or protected against forgery and/or security-certified, in particular through a data transmission via a transmission device, in particular from a upstream individual machine of the upstream sub-process to a downstream individual machine of the downstream sub-process. The use of encryption techniques and/or of a certificate enables here to be able to securely and reliably prove, even subsequently, a proper process sequence for a certain product of the process.

Further advantages, features, and properties of the invention result from the following description, in which exemplary embodiments of the invention are described in detail with reference to the illustrations. Here features referred to in the claims and in the description can each individually, or in any desired combination, be relevant to the invention. The Figures show in:

FIG. 1 a schematic representation of a system according to the invention,

FIG. 2 a schematic representation of a device according to the invention, and

FIG. 3 a schematic representation for visualizing a method according to the invention.

In the following figures, the identical reference characters are used for the same technical features, even of different exemplary embodiments.

In FIG. 1, a system 1 according to the invention is schematically represented, wherein an overall process 110 is represented. The overall process 110 here includes, for example, multiple sub-processes 120, for example a first (upstream) sub-process 120a, a second (upstream) sub-process 120b, and/or a third (or first downstream) sub-process 120c. In each of the sub-processes 120, at least one individual machine 2 is provided here, which, for example, can be configured as a device 10 according to the invention. Thus, for example, a first (upstream) individual machine 2a can be configured as a filling machine, a second (upstream) individual machine 2b can be configured as a palletizer, and/or a third (downstream) individual machine 2c can be configured as a hood stretcher. In particular, in each sub-process 120, and/or in each individual machine 2, a determination of at least one overall-process-relevant process data value, through a detecting of at least one overall-process-relevant sub-process parameter of the respective individual machine 2 and/or device 10 according to the invention is possible. To that end, at least one or each individual machine 2 includes at least one sensor 30, In particular, at least one or each individual machine 2 includes at least one data storage unit 20, in order to, for example, permanently store the process data values. For the transmission of the process data values, a transmission device 3 is moreover provided, which is configured, for example, as a network and/or as a radio transmission system. A (single) process default 130 is provided and/or defined across sub-process, that means for a first sub-process 120a, as well as also for a second sub-process 120a, as well as also for a third sub-process 120c.

In FIG. 2, a device 10 according to the invention is more closely represented. Here, the device 10 according to the invention can, for example, comprise a sensor 30, and/or a processing device 40 for processing the process data values, and/or an interface device 50 for connecting to further devices 10 according to the invention, and/or individual machines 2. Moreover, in particular a data storage unit 20 is also provided, wherein the data storage unit 20 is electrically connected to the sensor 30, and/or the processing device 40, and/or the interface device 50, for example on a circuit board, not represented, of the device 10 according to the invention.

FIG. 3 schematically visualizes a method 100 according to the invention. Here, according to a first method step 100.1, at least on overall-process-relevant process data value is determined in at least one upstream sub-process 120a, 120b of the (overall) process 110. According to a second method step 100.2, the overall-process-relevant process data value is, alternatively or additionally to the first method step 100.1, determined in a downstream sub-process 120c of the process 110. According to a third method step 100.3, a plausibility check of the determined process data value occurs outside of the upstream process 120a, 120b, in particular in such a manner that the process data value is compared with a respective comparison value of the process default 130.

The preceding description of the embodiments describes the present invention exclusively within the scope of examples. Of course, individual features of the embodiments can, insofar as technically useful, be freely combined with one another, without leaving the scope of the present invention.

LIST OF REFERENCE CHARACTERS 1 system
2 individual machine
2a first/upstream individual machine
2b second/upstream individual machine
2c downstream individual machine, third individual machine
3 transmission device
10 device
20 data storage unit 30 sensor
40 processing device
50 interface device
100 method
100.1 first method step
100.2 second method step
100.3 third method step
110 process, overall process
120 sub-process
120a first/upstream sub-process
120b second/upstream sub-process
120c first downstream sub-process, third sub-process
150 process default

The invention claimed is:

1. A device for an industrial automated process,
wherein
the process includes at least two sub-processes,
an individual machine is respectively provided for each sub-process, in order to at least partially carry out the sub-process, and
at least one of these respective individual machines is configured as the device, the device comprising:
a sensor for determining an overall-process-relevant process data value, relevant to the process, through a detection of an overall-process-relevant sub-process parameter of the device, wherein the overall-process-relevant sub-process parameter is a measured variable on the device,
a processing device which is electrically connected to the sensor for the processing of the overall-process-relevant process data value, and
an interface device configured for a data connection and forwarding of the overall-process-relevant process data value to an upstream individual machine located upstream in the process,
wherein
the processing device of the device is configured to evaluate the process through a comparison of the overall-process-relevant process data value with a predefined process default in order to detect deviations or errors based on the overall-process-relevant process data value,
the device comprises a data storage unit that is non-volatile and configured for persistent data storage in order to store the determined overall-process-relevant process data value permanently,
the predefined process default comprises a comparison value for the overall-process-relevant process data value,
the comparison value defines a range of values, and
wherein the processing device of the device is configured to control the entire process adaptively, such that:
the processing device of the device is configured to initiate a warning sequence, if, according to plausibility checks, a deviation of the overall-process-relevant process data value from the range of values is determined, and
the processing device of the device is configured to initiate the warning sequence upon determination of a negative evaluation result, and configured to request or evaluate an operator input to adjust the comparison value.

2. The device according to claim 1,
wherein
the device is configured as a robot.

3. A method for an evaluation in the process,
wherein
the process includes the sub-processes,
the individual machine is respectively provided for each sub-process, in order to at least partially carry out the sub-process,
at least one of these respective individual machines is configured as a device according to claim 1,
a process default is predefined across the sub-processes, which comprises the comparison value for the overall-process-relevant process data value, and
the comparison value defines a range of values,
wherein the method comprises the following actions carried out through the device:
a) determining the overall-process-relevant process data value in a downstream sub-process, and
b) checking the plausibility of the overall-process-relevant process data value outside of an upstream sub-process such that the overall-process-relevant process data value is compared with the comparison value, whereby an evaluation result specific for the process is established in order to detect deviations or errors based on the overall-process-relevant process data value,
c) evaluating the upstream sub-process based on the evaluation result adaptively,
d) permanently storing the overall-process-relevant process data value in a process recording, and
e) initiating the warning sequence, if, according to the plausibility checks of step (b), a deviation of the overall-process-relevant process data value from the range of values is determined, and
f) initiating the warning sequence upon determination of a negative evaluation result, and requesting or evaluating an operator input to adjust the comparison value.

4. The method according to claim 3,
wherein
a permanent storing of evaluation result or the overall-process-relevant process data value is effected centrally for all sub-processes of the process, in the process recording.

5. The method according to claim 3,
wherein the method further comprises:
providing an identifier to a product of the downstream sub-process, wherein the identifier is a machine-readable code, which at least comprises information about the process recording, or is created depending upon the process recording.

6. The method according to claim 3,
wherein
the warning sequence includes a notice to an operator of the downstream sub-process.

7. The method according to claim 3,
wherein
each sub-process is performed by respectively the individual machine assigned to the respective sub-process, wherein in each sub-process the overall-process-relevant sub-process data value, specific to the respective sub-process, is determined, wherein the overall-process-relevant sub-process data value at least includes at least one measured value or one measured value curve.

8. The method according to claim 3,
wherein
the overall-process-relevant process data value is determined at least through the detection of a material-specific or individual-machine-specific or product-specific or supply-process-specific, overall-process-relevant sub-process parameter.

9. The method according to claim 3, wherein the plausibility checks of step (b) are carried out adaptively, in that the warning sequence is initiated upon determination of a negative evaluation result, so that an operator input to adjust the comparison value is at least requested or evaluated.

10. The method according to claim 3, wherein at least a storage or a forwarding of the overall-process-relevant process data value occurs at least encrypted or protected against forgery or security-certified.

11. The method according to claim 3, wherein the overall-process-relevant process data value is determined in the upstream sub-process, wherein the downstream sub-process carries out the plausibility check of the overall-process-relevant process data value determined in the upstream sub-process, so that a downstream individual machine of the downstream sub-process is actuated, depending upon the overall-process-relevant process data value determined in the upstream subprocess.

12. A system for an industrial automated process, wherein the process includes at least two sub-processes, the system comprising:

at least two individual machines respectively for carrying out a respective sub-process of the process, wherein the individual machines respectively comprise:

a sensor for determining an overall-process-relevant process data value, relevant to the process, through a detection of a respective overall-process-relevant sub-process parameter on the corresponding individual machine, a transmitting device for data connection with the respective individual machines, in order to provide the overall-process-relevant process data value across sub-processes, and a data storage unit for permanent storing of the overall-process-relevant process data value, wherein a processing device of at least one of the two individual machines is configured to evaluate the process through a comparison of the overall-process-relevant process data value with a pre-defined process default in order to detect deviations or errors based on the overall-process-relevant process data value, the predefined process default comprises a comparison value for the overall-process-relevant process data value, the comparison value defines a range of values, wherein the processing device of the device is configured to control the entire process adaptively, such that:

the processing device of the device is configured to initiate a warning sequence, if, according to plausibility checks, a deviation of the overall-process-relevant process data value from the range of values is determined, and the processing device of the device is configured to initiate the warning sequence upon determination of a negative evaluation result, and configured to request or evaluate an operator input to adjust the comparison value.

13. The system according to claim 12, wherein the individual machines include at least one of the following machines:

a hood stretcher, wherein the overall-process-relevant sub-process parameter is a force/path course in the stretching of a film through the hood stretcher, a palletizer, wherein the overall-process-relevant sub-process parameter is a force in the moving of a product (of the process) through at least the palletizer, or a weight or a height of the pallet of the palletizer, and a filling machine or a form-fill-seal machine, wherein the overall-process-relevant sub-process parameter is a force in the further transport of at least the product or a filling time or a bulk density or a weight of the product (of the process).

14. The system according to claim 12, wherein at least one of the individual machines is configured as a device for the process and comprises:

the sensor for determining the overall-process-relevant process data value, relevant to the process, through a detection of the overall-process-relevant sub-process parameter of the device, wherein the overall-process-relevant sub-process parameter is a measured variable on the device, the processing device which is electrically connected to the sensor for the processing of the overall-process-relevant process data value, and an interface device for the data connection and forwarding of the overall-process-relevant process data value to an upstream individual machine located upstream in the process, wherein the processing device of the device is configured to evaluate the process through a comparison of the overall-process-relevant process data value with a pre-defined process default.

* * * * *